Figure 1:
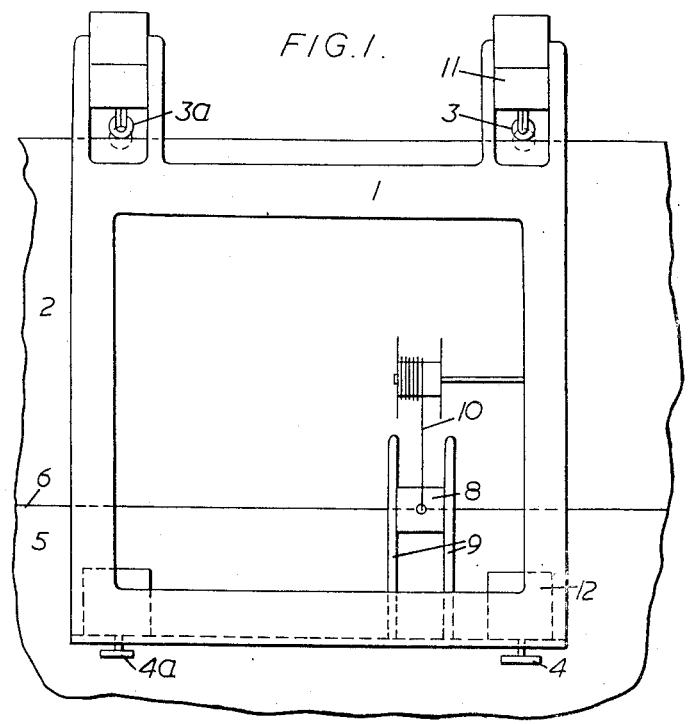

Aug. 16, 1960  J. A. LUCEY  2,949,527
ELECTRIC ARC WELDING

Filed March 30, 1959  3 Sheets-Sheet 1

Inventor
JOHN ANTHONY LUCEY

By
Aaron L. Townshend Attorney

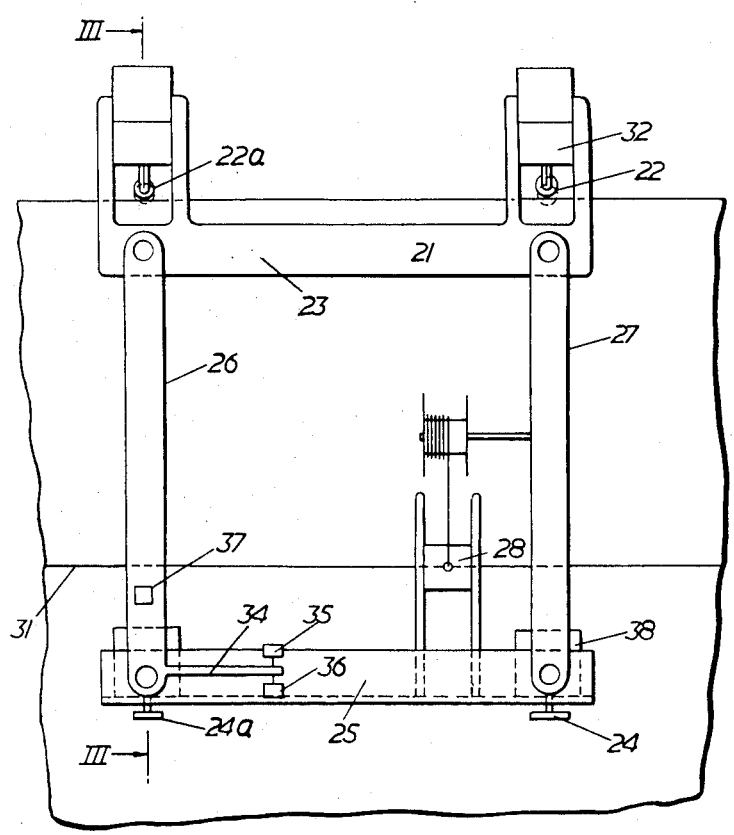

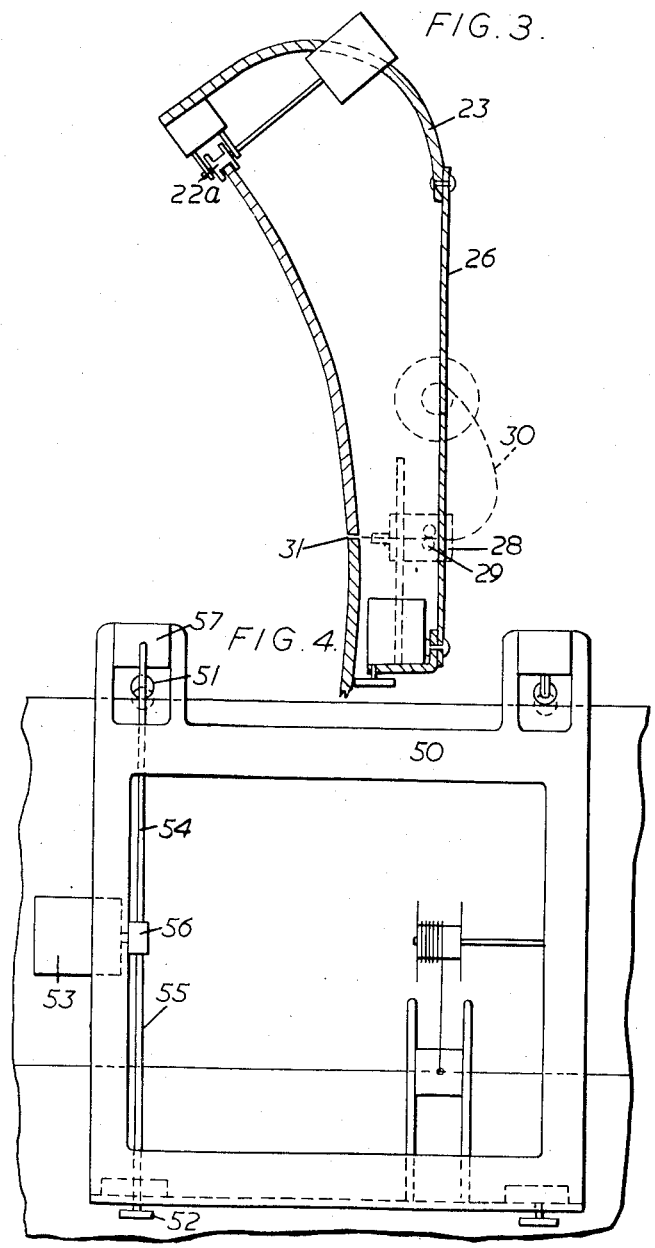

United States Patent Office

2,949,527
Patented Aug. 16, 1960

2,949,527

ELECTRIC ARC WELDING

John A. Lucey, Newcastle-upon-Tyne, England, assignor to The British Oxygen Company Limited, a British company Filed Mar. 30, 1959, Ser. No. 802,789

Claims priority, application Great Britain Apr. 9, 1958

5 Claims. (Cl. 219—126)

This invention relates to electric arc welding and more particularly to methods and apparatus for the welding of curved seams in the fabrication of large structures having a spherical or other curved surface.

In the fabrication on site of large spherical structures, such as the spherical reactor vessels used in nuclear power stations, it is normal practice to weld together successive rings of metal plates by means of horizontal seams. Because of the curvature of the plates at both sides of the seam it has not been found possible to use automatic welding techniques in the welding of such seams and manual techniques have therefore been adopted.

It is an object of the present invention to provide a method and apparatus which enables the horizontal seams in such spherical structures to be welded using automatic techniques.

According to one aspect of the present invention, in a method of welding a curved seam between metal plates which together define a curved shell that corresponds approximately to at least a part of a surface of revolution in which the radius of revolution varies in accordance with its position along the axis of revolution, a welding head is moved along the seam by two driving rollers spaced transversely to the seam, these rollers are caused to travel along paths of different lengths on a supporting surface or surfaces, during the movement of the welding head, and the peripheral speeds of the rollers are correlated to result in an approximately steady movement of the welding head along the seam.

The supporting surface for one or both of the driving rollers may be provided by an upwardly facing surface of the curved shell. One of the driving rollers will in general be disposed at a higher level than the other driving roller and the supporting surface for this first driving roller may be provided by the upper edge of the metal plates.

Whilst the invention has been developed primarily for the welding of horizontal seams in spherical or part-spherical shells it will be appreciated that it may be applied to curved shells of other shapes. Thus it may be applied to conical shells and more generally to other surfaces of revolution in which the radius of revolution varies with its position along the axis of revolution. It is not necessary however that the shell should accurately conform to a surface of revolution.

According to another aspect of the present invention, apparatus for use in the welding of a curved seam between metal plates which together define a curved seam that corresponds approximately to at least a part of a surface of revolution in which the radius of revolution varies in accordance with its position along the axis of revolution comprises a support for a welding head, two driving rollers for the support spaced transversely with respect to their direction of travel during the welding operation and means for positively driving the driving rollers at different peripheral speeds which are correlated to ensure an approximately steady movement along the seam of a welding head carried by the support.

The means for correlating the speeds may be responsive to tilting of the leading and trailing parts of the support and may increase and decrease the peripheral speed of one of the driving rollers to ensure steady movement along the seam of a welding head carried by the support.

Alternatively, where the mounting of the driving rollers is such that one of these rollers can be advanced or retarded parallel to the seam with respect to the other roller then the means for correlating the speeds may be responsive to a leading or lagging of one set of rollers relative to the other.

The driving rollers may be driven from a common source of motive power by means of a differential gear.

Three constructions of apparatus according to the invention for the welding of horizontal seams between rings of metal plates in the construction of large spherical vessels will now be described by way of example with reference to the four figures of the accompanying diagrammatic drawing in which:

Fig. 1 is a side elevation of the first construction of apparatus shown in position for welding a horizontal seam between plates which define a part-spherical shell, Fig. 2 is a side elevation of the second construction of apparatus shown in a similar position, Fig. 3 is a section on the line 111—111 in Fig. 2, and Fig. 4 illustrates the driving arrangement for a third construction of apparatus which is in many respects similar to the first construction.

Referring now to the drawings, and particularly to Fig. 1 thereof, the first construction of apparatus comprises a rigid support frame 1 arranged to be supported on an upper plate 2 by a flanged upper pair of rollers 3, 3a, engaging the upper edge of the plate 2 and by a lower pair of rollers 4, 4a, engaging the surface of a lower plate 5. The plates 2 and 5 are curved both along the line of the seam 6 to be welded and at angles to this seam so as to define a part-spherical shell. The plates 2 and 5 are supported so that the seam 6, which is parallel to the upper edge of the plate 2, extends horizontally. In some instances the upper pair of rollers 3, 3a, may engage a track parallel to the upper edge of plate 2.

Mounted on the support frame 1 in welding relationship to the seam 6 and close to the lower pair of rollers is an automatic welding head 8 of any suitable type. This welding head 8 is mounted for adjustment on rails 9 and arranged to feed a welding wire 10 to a welding arc formed at the seam 6. The invention is not restricted to the use of any specific welding process and use may therefore be made, for example, of flux coated or uncoated welding wire, if desired with a shielding gas of argon, helium or carbon dioxide or with a submerged arc flux supported where necessary by a travelling flux support belt.

The support frame 1 is arranged to be driven along the plates 2 and 5 by electric motors 11 and 12 arranged to rotate the rollers 3 and 4 respectively. In driving the support frame 1 round a ring of plates to be welded, the rollers 3, 3a and 4, 4a, have to travel different distances unless the pairs of rollers are equally spaced on opposite sides of the equatorial plane of the spherical shell. Accordingly the peripheral speeds of the rollers are correlated to result in a steady movement of the welding head 8 along the seam 6. It will be appreciated that the welding conditions will at times be satisfied when this movement is not absolutely steady and the accuracy of the control of motor speeds will be determined accordingly. To control the speed of motor 11, limit switches are incorporated in the mountings for the rollers 3 and 3a. These limit switches are responsive to the loads applied to the rollers 3 and 3a. Thus if the lower driving roller 4 is being driven at too fast a rate, the leading end of the support frame 1 will tend to lift with the result that the load applied to roller 3a is reduced. Actuation of the limit switch associated with roller 3a is thereby effected, and the speed of motor 11 is increased by means of this limit switch. The upper part of the support frame 1 will then be brought into line with the lower part of the support frame to advance steadily around the ring of plates. If the speed of the driving roller 4 is too slow compared with that of the driving roller 3 then the trailing end of the support frame 1 will tend to lift and the load applied to driving roller 3 will be reduced. The speed of motor 11 will then be decreased as a result of actuation of the limit switch associated with driving roller 3.

Various control systems can be used for motor 11; thus if this motor is a direct current electric motor the limit switches associated with the rollers 3 and 3a may introduce or withdraw a resistor from its field excitation circuit. If desired, both motor 11 and motor 12 may be controlled by means responsive to tilting of the support frame 1.

Referring now to Figs. 2 and 3, the second construction of apparatus includes a support frame which embodies a loosely jointed parallelogram linkage 21. An upper pair of rollers 22, 22a, are mounted on the upper link 23 of this linkage 21, and a lower pair of rollers 24, 24a are mounted on the lower link 25 of the linkage. The lower link 25 is supported from the upper link 23 by leading and trailing links 26 and 27 respectively. A welding head 28 is carried by the lower link 25, this welding head being of any suitable type as in the first construction, and having feed rolls 29 arranged to feed an electrode wire 30 to the welding arc formed at the seam 31 to be welded. To control the speed of a motor 32 arranged to drive upper roller 22, an arm 34 mounted on the leading link 26 is arranged to actuate one or other of two limit switches 35 and 36 if the angular relationship between the links of the linkage 21 varies from the desired relationship. Alternatively the motor speed may be controlled by a tilt switch 37 mounted on one of the links 26 and 27. If desired, the speed of a motor 38 arranged to drive lower roller 24 may also be controlled. Thus too high or too low a speed of the driving rollers 22 or 24 will result in a leading or lagging of one roller relative to the other and a variation of the angular relationship between the links of the linkage 21. The energisation of the controlled motor or motors will then be automatically varied by the means responsive to the variation of this relationship in order to correct the relative speeds of the driving rollers.

In the third construction of apparatus shown in Fig. 4, a rigid support frame 50 is used as in the first construction, and upper and lower driving rollers 51 and 52 are used to move the apparatus along plates to be welded. In this third construction however a single electric motor 53 is arranged to drive both rollers 51 and 52 through shafts 54 and 55 by way of a differential gear 56. A universal joint is shown at 57. The speeds of the rollers 51 and 52 are thus automatically correlated to produce the desired steady movement of the apparatus.

I claim:

1. Apparatus for use in the welding of a substantially horizontal curved seam between an upper and a lower metal plate which together define a portion of a curved shell that corresponds approximately to a surface of revolution in which the radius of revolution varies in accordance with its position along the axis of revolution comprising: a support for a welding head; two driving rollers attached to the support and spaced transversely to the direction of the weld seam, one of which is adapted to drivingly engage the top edge of the upper plate being welded, and the other of which is adapted to drivingly engage the lower plate being welded; a welding head mounted on the lower half of the support and arranged to be positioned in welding relationship to the weld seam; controlling means for detecting a tendency for the roller drivingly engaging the lower plate to lead or lag with respect to the roller drivingly engaging the upper plate and for controlling the speeds of the rollers to minimise this tendency; and means for positively driving the rollers at different peripheral speeds whose magnitudes are correlated by the controlling means to ensure an approximately steady movement of the welding head along the seam.

2. Apparatus as claimed in claim 1 wherein the two driving rollers are arranged to be driven by independent motive power means and the controlling means includes at least one electric switch which is responsive to the load carried by the driving roller which drivingly engages the top edge of the upper plate being welded.

3. Apparatus as claimed in claim 1 wherein the support includes a loosely-jointed parallelogram linkage, wherein the two driving rollers are attached to opposite links of the parallelogram linkage, and wherein the controlling means is responsive to a change in the angular relationship of adjacent links of the parallelogram linkage.

4. Apparatus as claimed in claim 3 wherein the controlling means includes an electric switch mounted on one link of the parallelogram linkage and actuated by an adjacent link of the parallelogram linkage.

5. Apparatus as claimed in claim 1 wherein the controlling means includes a tilt switch mounted on the support.

References Cited in the file of this patent

UNITED STATES PATENTS 2,678,987    Talley _____ May 18, 1954